US008787149B1

(12) United States Patent
Ramanathan et al.

(10) Patent No.: US 8,787,149 B1
(45) Date of Patent: Jul. 22, 2014

(54) MAC ADDRESS SYNCHRONIZATION FOR MULTI-HOMING WITH MULTICHASSIS LINK AGGREGATION

(75) Inventors: Ramasamy Ramanathan, Santa Clara, CA (US); Deepak Ojha, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 225 days.

(21) Appl. No.: 13/405,016

(22) Filed: Feb. 24, 2012

Related U.S. Application Data

(60) Provisional application No. 61/593,660, filed on Feb. 1, 2012.

(51) Int. Cl.
*H04L 12/28* (2006.01)

(52) U.S. Cl.
USPC .............................. 370/216; 370/400; 370/235

(58) Field of Classification Search
CPC ...... H04L 45/28; H04L 45/122; H04L 45/245
See application file for complete search history.

(56) References Cited

U.S. PATENT DOCUMENTS

| 2008/0069100 A1* | 3/2008 | Weyman et al. ............. 370/390 |
| 2011/0032945 A1* | 2/2011 | Mullooly et al. ............. 370/401 |
| 2012/0033541 A1* | 2/2012 | Da Silva et al. ............. 370/217 |

OTHER PUBLICATIONS

Martini et al., "Inter-Chassis Communication Protocol for L2VPN PE Redundancy," draft-ietf-pwe3-iccp-04.txt, Internet Draft, Oct. 13, 2010, 78 pp.
Frazier et al., "IEEE 802.3ad Link Aggregation (LAG)," Apr. 17, 2007, 13 pp.
Zimmermann, "OSI Reference Model—The ISO Model of Architecture for Open Systems Interconnection," IEEE Transactions on Communications, vol. Com-28, No. 4, Apr. 1980, pp. 425-432.

* cited by examiner

*Primary Examiner* — Huy D Vu
*Assistant Examiner* — Teisha D Hall
(74) *Attorney, Agent, or Firm* — Shumaker & Sieffert, P.A.

(57) ABSTRACT

In general, techniques are described for using a light-weight protocol to synchronize layer two (L2) addresses that identify routable traffic to multiple L3 devices, such as PE routers, that cooperatively employ an active-active redundancy configuration using a multi-chassis LAG to provide an L2 network with redundant connectivity. In one example, a network device establishes a multi-chassis LAG with a peer network device to provide redundant connectivity to a layer three (L3) network. A synchronization module of the network device receives a synchronization message that specifies an L2 address of the peer network device. When the network device receives an L2 packet data unit (PDU) from the L2 network, a routing instance of the network device routes an L3 packet encapsulated therein when the PDU has an L2 destination address that matches the L2 address of the peer network device.

21 Claims, 6 Drawing Sheets

MAC ADDRESS SYNCHRONIZATION FOR MULTI-HOMING WITH MULTICHASSIS LINK AGGREGATION

This application claims the benefit of U.S. Provisional Application No. 61/593,660, filed Feb. 1, 2012, the entire content of which is incorporated herein by reference.

TECHNICAL FIELD

This disclosure relates to computer networks and, more specifically, to network routing and bridging.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a common L2 networks is an Ethernet network in which end point devices (e.g., servers, printers, computers) are connected by one or more Ethernet switches or other L2 network devices. The Ethernet switches forward Ethernet frames, also referred to as L2 communications or L2 packets to devices within the network. As the Ethernet switches forward the Ethernet frames the Ethernet switches learn L2 state information for the L2 network, including media access control (MAC) addressing information for the devices within the network and the physical ports through which the devices are reachable. The Ethernet switches typically store the MAC addressing information in MAC tables associated with each of their physical interfaces. When forwarding an individual Ethernet frame, an ingress port of an Ethernet switch typically multicasts the Ethernet frame to all of the other physical ports of the switch unless the Ethernet switch has learned the specific physical port through which the destination MAC address devices is reachable. In this case, the Ethernet switch forwards a single copy of the Ethernet frame out the associated physical port.

Some layer three (L3) networks that route communications at the third layer of the Open Systems Interconnection (OSI) reference model, i.e., the network layer, employ L3 network devices that also perform L2 functionality to bridge and switch L2 communications to other L3/L2 and L2 network devices within the networks. In a typical configuration, provide edge (PE) routers coupled to customer network sites bridge L2 communications between the customer network sites on customer-facing interfaces and simultaneously route L3 communications over the L3 network core on core-facing interfaces. Each of the PE routers thus operates as a L2 switch having L2 customer- and L3 core-facing interfaces to connect the multiple LAN segments of what is, in some cases, an overall customer network defined by the individual customer network sites.

In some cases, a customer network site may be given redundant connectivity to a network through multiple PE routers. This form of redundancy is referred to as "multi-homing" and can be implemented in active-standby or active-active configuration. In active-standby multi-homing, one of the multiple PE routers coupled to the customer network is traditionally chosen as the active PE router, or designated forwarder, to send traffic to and from the customer network. The other one or more PE routers are designated as backup forwarders which can be used to send traffic to and from the customer network in the event of a network failure that would preclude the current designated forwarder from sending the traffic. In active-active multi-homing, each of the multiple PE routers by which the customer network site has connectivity to a network actively bridges traffic to and from the customer network.

In both active-standby and active-active redundancy configurations, the multiple PE routers that provide redundant connectivity traditionally execute a virtual router protocol, such as Virtual Router Redundancy Protocol (VRRP), to present a uniform L2 interface in the form of a virtual gateway L2 address to one or more customer networks attached to the PE routers. Hosts of the customer networks may address packets for routing external to the L2 domain to the virtual gateway L2 address to identify such packets to the PE routers, which then route the packets according to a routing instance toward the L3 core network.

SUMMARY

In general, techniques are described for using a light-weight protocol to synchronize integrated routing and bridging (IRB) L2 addresses that identify routable traffic to multiple L3 devices, such as PE routers, that cooperatively employ an active-active redundancy configuration using a multi-chassis link aggregation group (LAG) to provide a customer network with redundant L2 connectivity. The multiple L3 devices further operate as respective gateways for the customer network to an L3 network, such as the Internet, and synchronize their respective IRB L2 addresses to enable the L3 devices to identify routable traffic received on any of the links of the multi-chassis LAG and addressed to an IRB interface of any of the L3 devices.

In one example, "active-active" multi-homing PE routers are configured to operate a multi-chassis LAG of customer-facing L2 interfaces that service multi-chassis LAG links for the multi-homed customer network. Each of the multiple PE routers includes an integrated routing and bridging (IRB) instance having an IRB L2 address that is unique within the L2 network that includes the customer-facing interfaces of the PE routers and the customer network. As described herein, the PE routers synchronize their respective gateways by exchanging IRB L2 addresses with one another using, for example, Inter-chassis Configuration Protocol (ICCP) operating over one or more inter-chassis links coupling the PE routers. Each of the multi-homing PE routers for a customer network generates a list of IRB L2 addresses using IRB L2 addresses received from the other multi-homing PE routers.

The IRB instances receive L2 packet data units (PDUs) on respective links of the multi-chassis LAG coupled to the respective PE routers that include the IRB instance and bridge the L2 PDUs in the bridge domain. Subsequent to IRB L2 address synchronization, however, when an IRB instance receives an L2 PDU that includes an L2 header having a destination address set to any of the IRB L2 addresses included in the list of IRB L2 addresses, the IRB diverts the L2 PDU to a routing instance, and the PE router then forwards the L3 traffic received in the L2 PDU in accordance with the routing instance. In this manner, an IRB instance for any of the multi-homing PE routers identifies routable packets encapsulated in L2 PDUs destined for IRB L2 addresses of IRB instances of the any of the multi-homing PE routers.

Hosts of the customer network multi-homed to the multi-homing PE routers may direct routable traffic to any of the IRB L2 addresses returned in Address Resolution Protocol (ARP) requests by respective hosts. Moreover, a customer network device that operates the customer side of the multi-chassis LAG load balances upstream L2 PDUs over any of the links to the multi-homing PE routers irrespective of the L2 PDUs' destination. The described techniques may enable the IRB instances to identify L2 PDUs destined to IRB L2 addresses of the any of the multi-homing router as including routable traffic. As a result, an IRB instance may avoid unnecessarily sending L2 PDUs destined for the IRB L2 address of another IRB instance over an inter-chassis link connecting the corresponding multi-homing PE routers.

The techniques may provide one or more additional advantages. For example, whereas conventional multi-homing makes use of VRRP to present a virtual network address for the multi-homing PE routers as a gateway to the customer network, the techniques of this disclosure may allow customer networks to use the network addresses of the multi-homing PE routers. Because hosts of the customer network may be participating in thousands of virtual LANs, each requiring according to conventional multi-homing a separate instance of VRRP executing on the multi-homing PE routers as well as a separate virtual network address, the described techniques may conserve thousands of network addresses in the customer network subnet. Furthermore, each of the multi-homing PE routers may avoid executing thousands of VRRP instances and instead utilize a light-weight protocol, e.g., ICCP, to synchronize IRB addresses to implement active-active multi-homing with a multi-chassis LAG in accordance with techniques described herein. Also, whereas VRRP performs periodic messaging, ICCP and other light-weight protocols may offer immediate IRB L2 address synchronization.

In one example, a method comprises establishing, with a router, a multi-chassis link aggregation group (LAG) in an active-active multi-homing configuration with a peer router to provide redundant layer three (L3) connectivity to an L3 network. The method also comprises receiving, with the router, a synchronization message that specifies a layer two (L2) address of the peer router. The method further comprises associating the L2 address of the peer router and an L2 address of the router with a routing instance of the router without using a virtual gateway L2 address shared by the router and the peer router. The method also comprises receiving, with the router, an L2 packet data unit (PDU) from the L2 network. The method further comprises routing, with the routing instance of the router, an L3 packet encapsulated at least in part by the PDU to the L3 network when the PDU has an L2 destination address that matches the L2 address of the peer router or the L2 address of the router.

In another example, a network device comprises a control unit comprising one or more processors. The network device also comprises an interface of the control unit for a multi-chassis link aggregation group (LAG) in an active-active multi-homing configuration with a peer network device of the network device to provide redundant layer three (L3) connectivity to an L3 network. The network device further comprises a synchronization module of the control unit to receive a synchronization message that specifies an layer two (L2) address of the peer network device, wherein the synchronization module associates the L2 address of the peer network device with a routing instance of the network device, wherein an L2 address of the network device is also associated with the routing instance of the network device, and wherein neither the L2 address of the peer network device nor the L2 address of the network device comprises a virtual gateway L2 address shared by the network and the peer network device, wherein the interface receives an L2 packet data unit (PDU) from the L2 network. The network device further comprises a routing instance of the control unit to route a layer three (L3) packet encapsulated at least in part by the PDU to the L3 network when the PDU has an L2 destination address that matches the L2 address of the peer network device or the L2 address of the network device.

In another example, a non-transitory computer-readable medium comprises instructions. The instructions cause one or more programmable processors to establish, with a router, a multi-chassis link aggregation group (LAG) in an active-active multi-homing configuration with a peer router to provide redundant layer three (L3) connectivity to an L3 network. The instructions also cause the programmable processors to receive, with the router, a synchronization message that specifies an layer two (L2) address of the peer router. The instructions further cause the programmable processors to associate the L2 address of the peer router and an L2 address of the router with a routing instance of the router without using a virtual gateway L2 address shared by the router and the peer router. The instructions also cause the programmable processors to receive, with the router, an L2 packet data unit (PDU) from the L2 network. The instructions further cause the programmable processors to route, with the routing instance of the router, a layer three (L3) packet encapsulated at least in part by the PDU to an L3 network when the PDU has an L2 destination address that matches the L2 address of the peer router or the L2 address of the router.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
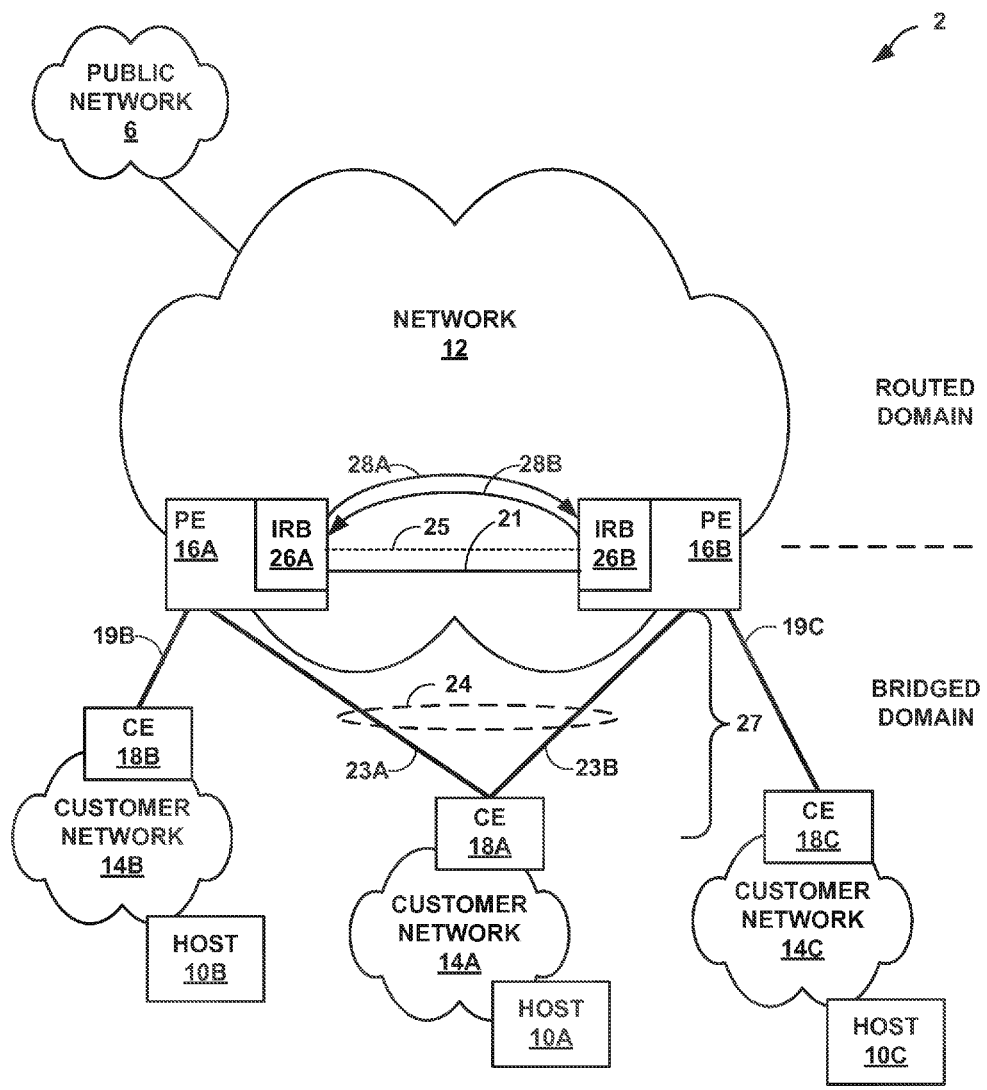
FIGS. 1-2 are block diagrams illustrating an example network system in which network devices synchronize layer two (L2) addresses to support an active-active multi-homed customer network according to techniques described herein.

FIG. 1 is a block diagram illustrating an example network system in which one or more network devices synchronize layer two (L2) addresses to support an active-active multi-homed customer network according to techniques described herein. As shown in FIG. 1, network system 2 includes a packet-switched network 12, public network 6, and customer networks 14A-14C ("customer networks 14"). Network 12 may represent a public network that is owned and operated by a service provider to interconnect a plurality of L2 networks, such as customer networks 14. As a result, network 12 may be referred to herein as a Service Provider (SP) network. Service provider network 12 may include, for instance, a local area network (LAN), a wide area network (WAN), the Internet, a virtual LAN (VLAN), an enterprise LAN, a layer 3 virtual private network (VPN), an Internet Protocol (IP) intranet, an enterprise IP network, or some combination thereof. Service provider network 12 may include a Multi-protocol Label Switching (MPLS) network and alternatively be referred to as an MPLS core or MPLS backbone. Example service providers include Verizon Communications, Inc. or American Telephone & Telegraph (AT&T™) Company. Public network 6 may represent another L3 network, such as the Internet, a public WAN, an autonomous system (AS) owned and operated by a service provider, or a layer three (L3) virtual private network (VPN), for instance.

The service provider for network 12 may lease portions of network 12 or provide switching (or bridging) services offering interconnection to customer networks 14, which may lease the portions or purchase the services provided by network 12 to participate in a bridged domain interconnecting the various layer 2 (L2) customer networks 14. Reference to layers followed by a numeral may refer to a particular layer of the Open Systems Interconnection (OSI) model. More information concerning the OSI model can be found in a IEEE publication entitled "OSI Reference Model—the ISO Model of Architecture for Open Systems Interconnection," by Hubert Zimmermann, published in IEEE Transactions on Communications, vol. 28, no. 4, dated April 1980, which is hereby incorporated by reference as if fully set forth herein.

Customer networks 14 may each represent a network owned and operated by an entity, such as a university, corporation, business, or other facility or enterprise. In some instances, a single large entity may own and operate two or more of customer networks 14. The entity may then contract with service provider network 12 to use a service offered by service provider network 12 in order to transparently interconnect these customer networks 14 in the manner described above.

Each of customer networks 14 may operate according to a wide variety of network protocols, such as any of the 802.3x family of network protocols related to the Ethernet protocol, any of the 802.1x family of wireless networking protocols, an Internet Protocol (IP) protocol, and a Transmission Control Protocol (TCP). Moreover, one or more of customer networks 14 may include a Virtual Private Network (VPN), a Local Area Network (LAN), a Wide Area Network (WAN), and/or one or more virtual LANs (VLANs).

Each of customer networks 14 includes a respective one of a plurality of customer edge (CE) routers 18A-18C ("CEs 18") that reside at an edge of the corresponding one of customer networks 14. Customer edge routers 18, while discussed herein with respect to a particular network device, i.e., a router, may each represent any network device that interfaces with a network, such as service provider network 12, to bridge, switch or otherwise forward network traffic directed to or originating from the network. For example, CEs 18 may each represent, in certain instances, one or more of an access layer switch, a hub, a bridge device (e.g., an Ethernet bridge), or any other L2 network device and, in some instances, L3 network devices capable of performing L2 functionality.

Each of customer networks 14 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection. In the illustrated example, each of customer networks 14 includes a respective one of hosts 10A-10C ("hosts 10") that communicate with one another using by a bridging service provided by service provider network 12. Each of hosts 10 may represent any of the computing devices mentioned above. Customer networks 14 may include many additional hosts, with various subsets of the hosts configured to use (or attached to network devices configured to use) corresponding VLANs of the customer network. In some instances, customer networks 14 represent data center locations for an enterprise data center providing geographically disperse servers, applications, and storage services. In such instances, each of hosts 10 may represent a single physical or a single virtual server of the enterprise data center.

Network 12 includes provider edge (PE) routers 16A-16B ("PEs 16") logically located at an edge of service provider network 12. While discussed herein with respect to a particular network device, i.e., a router, PEs 16 may each represent any network device that interfaces with a network, such as one of customer networks 14, to route, switch, bridge or otherwise forward network traffic directed to or originating from SP network 12. For example, PEs 16 may each represent, in certain instances, one or more of a switch, a hub, a bridge device (e.g., an Ethernet bridge), or any other L2 network device and, in some instances, L3 network device capable of performing L2 functionality.

PEs 16 couple to respective CEs 18B, 18C by respective service links 19B, 19C. Each of service links 19B, 19C is a physical or virtual circuit attaching one of CEs 18B, 18C to one of PEs 16 and may be, for example, a Frame Relay data link connection identifier, an asynchronous transfer mode (ATM) Virtual Path Identifier (VPI)/Virtual Channel Identifier (VCI), an Ethernet port, a VLAN, a Point-to-Point Protocol (PPP) connection on a physical interface, a PPP session from an L2 Tunneling Protocol (L2TP) tunnel, or a Multiprotocol Label Switching (MPLS) Label Switched Path (LSP), a Generic Route Encapsulation (GRE) tunnel, or another interface with bridged encapsulation. Service links 19A, 19B may each operate over a direct link and/or an L2 access network.

PEs 16 may provide one or more services to transparently interconnect customer networks 14 to one another. To continue the above example, an entity may own and operate each of customer networks 14 and purchase connectivity from the service provider to transparently interconnect each of customer networks 14 to one another via service provider network 12. In this case, PE 16A for example may emulate a direct connection in accordance with the service to PE 16B such that devices of customer network 14B (via CE 18B) may operate as if directly connected to customer network 14A (via CE 18A). Likewise, PE 16B may emulate a different direct connection in accordance with the service to PE 16C such that devices of customer network 14C (via CE 18C) may operate as if directly connected to customer network 14A (via CE 18A). In some instances, one or more of CEs 18 may include or otherwise operate as a L2 bridge between associated customer networks 14 and connected PEs 16. In such instances, PEs 16 implementing the bridging service "learn" multiple source L2 addresses of additional devices within the customer networks 14 from the bridging CEs 18. Techniques described herein may apply with respect to these multiple source L2 addresses in addition to, or instead of, to the learned source L2 addresses of CEs 18.

In the example of FIG. 1, customer network 14A is connected by a bridged L2 access network 27 that provides redundant physical L2 connectivity to SP network 10 through multiple PE routers 16A, 16B via multi-chassis link aggregation group (LAG) links 23A, 23B, a technique which is referred to as "multi-homing." Specifically, customer network 14A, via CE 18A, is multi-homed to SP network 10 through PE routers 16A and 16B.

Multi-homing PE routers 16A, 16B are configured to form a multi-chassis LAG 24 for multi-chassis LAG links 23A, 23B within bridged L2 access network 27 that provide L2 connectivity for multi-homed customer network 14A. In one example, each of CE 18A and PE routers 16A, 16B optionally execute the Link Aggregation Control Protocol (LACP) to bundle interfaces associated with multi-chassis LAG links 23A, 23B and treat the bundle as a single logical interface in terms of L2 forwarding. That is, CE 18A associates multi-chassis LAG links 23A, 23B with a single logical interface for purposes of L2 forwarding to utilize the links in parallel to load-balance L2 traffic to increase the link speed beyond the limits of any one single cable or port and/or to increase the redundancy for higher availability. Moreover, PE routers 16A, 16B form multi-chassis LAG 24 as a multi-chassis LAG in that multi-chassis LAG links 23A, 23B do not interconnect just two network devices but instead provide CE 18A with redundant connectivity to different network devices, i.e., PE routers 16A and 16B. PE routers 16A, 16B may execute an inter-chassis communication protocol (ICCP) to establish inter-chassis communication channel 25 over inter-chassis link (ICL) 21 and control forwarding with respect to multi-chassis LAG 24 as a single interface for reaching CE 18A. That is, although separate devices, PE routers 16A, 16B collectively treat multi-chassis LAG 24 as a single logical interface from a forwarding perspective even though each of the PE routers connect to only a subset of multi-chassis LAG links 23A, 23B that comprises the overall multi-chassis LAG. PE routers 16A, 16B may communicate L2 PDUs received from multi-chassis LAG 24 to each other on inter-chassis communication channel 25. Example details on an LACP can be found in IEEE 802.3ad, Aggregation of Multiple Link Segments, the contents of which are incorporated herein by reference. Example details on an ICCP can be found in Martini et al., "Inter-Chassis Communication Protocol for L2VPN PE Redundancy," IETF, Oct. 13, 2010, the contents of which are incorporated herein by reference.

PEs 16A, 16B are configured to provide an "active-active" link topology for multi-homed, bridged L2 access network 27. As a result, PEs 16A, 16B concurrently bridge L2 PDUs received on customer-facing multi-chassis LAG links 23A, 23B or service links 19B, 19C among CEs 18 and between one PEs 16A, 16B over inter-chassis communication channel 25. In addition, PEs 16A, 16B concurrently route L3 communications received on customer-facing multi-chassis LAG links 23A, 23B, as described more fully below. In this way, network resources may be more fully utilized in comparison to "active-standby" configurations in which only one of PEs 16A, 16B bridges L2 PDUs at any one time.

Each of PEs 16 includes a respective one of integrated routing and bridging interface instances 26A-26C ("IRBs 26") that connects multi-chassis LAG links 23A, 23B and service links 19B, 19C for the bridged domain at PEs 16 and additionally connects multi-chassis LAG links 23A, 23B to a routed domain that includes public network 6. IRBs 26A, 26B of multi-homing PEs 16A, 16B also connects inter-chassis communication channel 25 to the bridged domain. IRBs 26 thus each includes both a bridging instance that includes L2 learning tables a bridging instance at the respective PE 16, as well as a routing instance mapped to the IRB. IRBs 26 therefore act as L3 routing interfaces for a bridged domain in which respective PEs 16 participate. In this way, each of IRBs 26 provide simultaneous support for L2 bridging and L3 routing on a single interface with respective multi-chassis LAG links 23A, 23B for respective PEs 16. For example, IRB 26A provides L2/L3 support on the single interface to multi-chassis LAG links 23A coupled to PE 16A.

A "routing instance" is a routing entity for a router, e.g. any of PEs 16, that provides L3 routing functionality and may be used to create administrative separation in a large network to segregate customer traffic such that customers advertise/receive only customer routes and/or to create overlay networks in which PEs 16 route separate services (e.g., voice) only towards routers participating in that service. A routing instance includes a routing table or other structure storing routes to destinations, e.g., IP prefixes, routing policies, interfaces that belong to the routing instance, and protocol configurations (e.g., an Open Shortest Path First (OSPF) configuration). Routing instances may include routes for public network 6 and other destinations reachable by or within SP network 12, for example. The routing instance of any of IRBs 26 may be part of the main routing table for the corresponding one of PEs 16.

IRBs 26 of PEs 16 may operate as default gateways for customer networks 14 to the routed domain and thus respond to Address Resolution Protocol (ARP) requests specifying a network address of an IRB with an IRB L2 address that is unique among L2 addresses in the bridged domain. The unique IRB L2 address for each of IRBs 26 is a gateway L2 address (e.g., a gateway Media Access Control (MAC) address) that identifies routable packets within L2 PDUs destined for the gateway L2 address. In other words, provider edge routers 16 either route or switch L2 traffic arriving on respective multi-chassis LAG links 23A, 23B according to the destination address of the L2 traffic.

As IRBs of multi-homing PEs 16A, 16B operating as redundant gateways to the routed domain, IRBs 26A, 26B are configured to share a network address (i.e., a gateway network address) but are each associated with a unique IRB L2 address. An IRB L2 address for any of IRBs 26A may be a virtual or logical L2 address (i.e., not associated with physical interface) that is mapped to a routing instance in the IRB. An IRB L2 address may be a MAC address of a corresponding PE 16, the MAC address of an interface of a PE 16 that couples to a corresponding one of multi-chassis LAG links 23A, 23B, or any other L2 address that the IRB uses to classify PDUs arriving on an L2 interface of the PE router as L3 traffic. The IRB L2 addresses of IRBs 26A, 26B may be associated with multi-chassis LAG 24 such that CE 18A may forward L2 PDUs directed to either of these addresses over any of multi-chassis LAG links 23A, 23B.

As a result, IRB 26A responds to an ARP request, issued by host 10A for example and specifying the network address of the IRBs 26A, 26B, with the unique IRB L2 address for IRB 26A. Thereafter, host 10A addresses L2 PDUs that include routable traffic to the unique IRB L2 address for IRB 26A. CE 18A outputs such L2 PDUs to an interface for multi-chassis LAG 24, which may load-balance the L2 PDUs over multi-chassis LAG links 23A, 23B toward IRBs 26A, 26B.

IRBs 26 either route or switch L2 traffic arriving on respective multi-chassis LAG links 23A, 23B according to the destination address of the L2 traffic. In accordance with techniques of this disclosure, multi-homing PEs 16A, 16B synchronize (e.g., exchange) the IRB L2 addresses for identifying routable L3 traffic within respective IRBs 26. In the illustrated example, PE 16A sends an IRB L2 address synchronization message 28A (hereinafter, "synchronization message 28A") to PE 16B that peers with PE 16A in an active-active multi-homing configuration for customer network 14A. Synchronization message 28A includes the IRB L2 address of IRB 26A. Similarly, PE 16B sends an IRB L2 address synchronization message 28B (hereinafter, "synchronization message 28B") that includes the IRB L2 address of IRB 26B to PE 16A. Synchronization messages 28 may be exchanged by PEs 16A, 16B using a light-weight protocol, such as ICCP, that enables rapid convergence. ICCP, for example, offers immediate synchronization.

Upon receiving synchronization message 28A, PE 16B installs the included IRB L2 address to respective IRB 26B and maps the routing instance for the IRB 26B to the IRB L2 address (i.e., the IRB L2 address of IRB 26A). For example, PE 16B may install the included IRB L2 address as a local router L2 address for the bridged domain. Similarly, upon receiving synchronization message 28B, PE 16A installs the included IRB L2 address to respective IRB 26A and maps the routing instance for IRB 26A to the IRB L2 address (i.e., the IRB L2 address of IRB 26B). Each of the PEs 16A, 16B that cooperatively enable active-active multi-homing thus receives an IRB L2 address in synchronization messages 28 for one another and installs the IRB L2 address to its corresponding IRB.

Each of IRBs 26A, 26B may as a result have multiple IRB L2 addresses installed to its forwarding information, with each address corresponding to one of IRBs 26A, 26B of PEs 16A, 16B. Upon receiving L2 PDUs on multi-chassis LAG links 23A, 23B and destined for any of the IRB L2 addresses installed and mapped to the routing instance, IRBs 26A, 26B classify the L2 PDUs as including L3 packets, decapsulate and (if necessary) assemble L3 packets therein, and route the L3 packets according to the routing instances. IRBs 26A, 26B continue to switch L2 PDUs received from host 10A of customer network 14A that specify a non-gateway destination L2 address, e.g., an L2 address of host 10B, in accordance with the bridged domain.

IRBs 26A, 26B may therefore avoid unnecessarily sending L2 PDUs destined for the IRB L2 address of the other IRB over an inter-chassis link connecting the corresponding multi-homing PEs 16. For example, because CE 18A load-balances or "sprays" L2 PDUs from customer network 14A across multi-chassis LAG 24, IRB 26B may receive, on attachment circuit 23B, an L2 PDU that has a destination L2 address of the IRB L2 address of IRB 26A. Rather than switching the L2 PDU toward IRB 26A over inter-chassis communication channel 25, IRB 26B may identify the L2 PDU as including routable packets using the IRB L2 address of IRB 26A received in synchronization message 28A and mapped to a routing instance in IRB 26B.

In addition, PEs 16A, 16B may potentially provide active-active multi-homing to up to 4096 (4K) different customer networks (not shown) that connect to the PEs using VLAN-based service links for the customer networks each requiring respective IRB interface instances. Under conventional techniques, PEs 16A, 16B execute an instance of VRRP over each IRB interface instance to present a virtual network address for the multi-homing PE routers as a gateway to various customer networks. Again, under conventional techniques, this could require that each of PEs 16A, 16B execute up to 4K VRRP instances. The techniques of this disclosure, by contrast, may allow customer networks to request IRB L2 addresses by sending ARP requests to the physical network addresses of PEs 16A, 16B in the customer network 14A subnet (PEs 16A, 16B may be configured with a common network address for multi-homing purposes). This may in some instances eliminate any requirement to execute a VRRP instance for IRBs associated with any of the up to 4K VLANs. As a result, the described techniques may conserve up to 4K network addresses in the customer network 14A subnet as well as conserve processing resources in PEs 16A, 16B.

Figure 2:
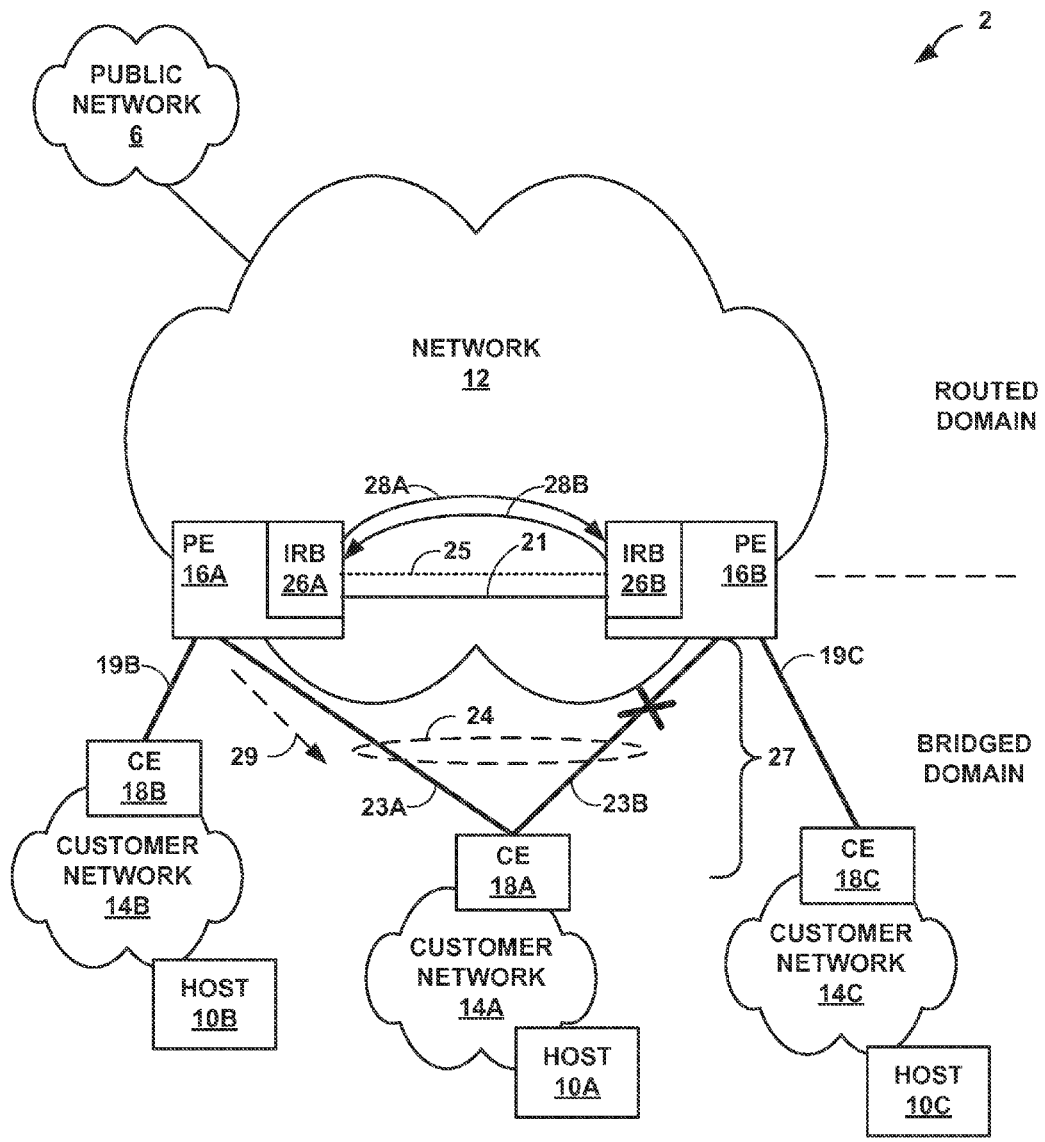

FIG. 2 is a block diagram illustrating recovery in the event of failure of multi-chassis LAG link 23B. The IRB L2 addresses of IRBs 26A, 26B may be configured as multi-chassis LAG 24 within CE 18A such that CE 18A may forward L2 PDUs directed to either of these addresses over any of multi-chassis LAG links 23A, 23B 23A, 23B. Prior to a failure of multi-chassis LAG link 23B, host 10A broadcasts an ARP request specifying a default network gateway address identifying PEs 16A, 16B. Because CE 18A connects to PE 16A, 16B by multi-chassis LAG 24, CE 18A may send the ARP request from host 10A by either (but not both) multi-chassis LAG link 23A or multi-chassis LAG link 23B. In this case, CE 18A sends the ARP request by multi-chassis LAG link 23B (again, prior to failure) to PE 16B and IRB 26B, which responds to host 10A with an ARP response that includes the IRB L2 address for IRB 26B. Host 10A thereafter addresses L2 PDUs that include routable L3 packets to the IRB L2 address for IRB 26B, which may be received by either IRB 26A or IRB 26B according to operation of multi-chassis LAG 24 and may be routed by either PE 16A or PE 16B in accordance with techniques described in this disclosure.

Upon failure of multi-chassis LAG link 23B due to, for example, a direct link failure or a failure of PE 16B or a component thereof that implements IRB 26B, CE 18A may no longer associate the IRB L2 address of IRB 26B with multi-chassis LAG 24. As a result, L2 PDUs sent by host 10A may be dropped at CE 18A. In accordance with techniques herein described, PE 16A broadcasts gratuitous ARP message 29 to customer network 14A over attachment circuit 23A to direct host 10A of customer network 14A to update any ARP table entries cached for the default gateway network address and/or to prompt host 10A to acquire a new L2 address for the default gateway network address. Gratuitous ARP message 29 may represent a gratuitous ARP request message or a gratuitous ARP reply message that associates the IRB L2 address for IRB 26A with the default gateway network address for host 10A. In the former case, host 10A may rebroadcast an ARP request for eventual receipt and response by PE 16A. In the latter case, host 10A may add an APR table entry associating the default gateway network address with the IRB L2 address for IRB 26A. PEs 16 may in this manner use ICCP-based (in this example) synchronization messages 28 and gratuitous ARP message 29 to facilitate rapid convergence in the event of attachment circuit failure and resultant multi-chassis LAG switchover.

Figure 3:
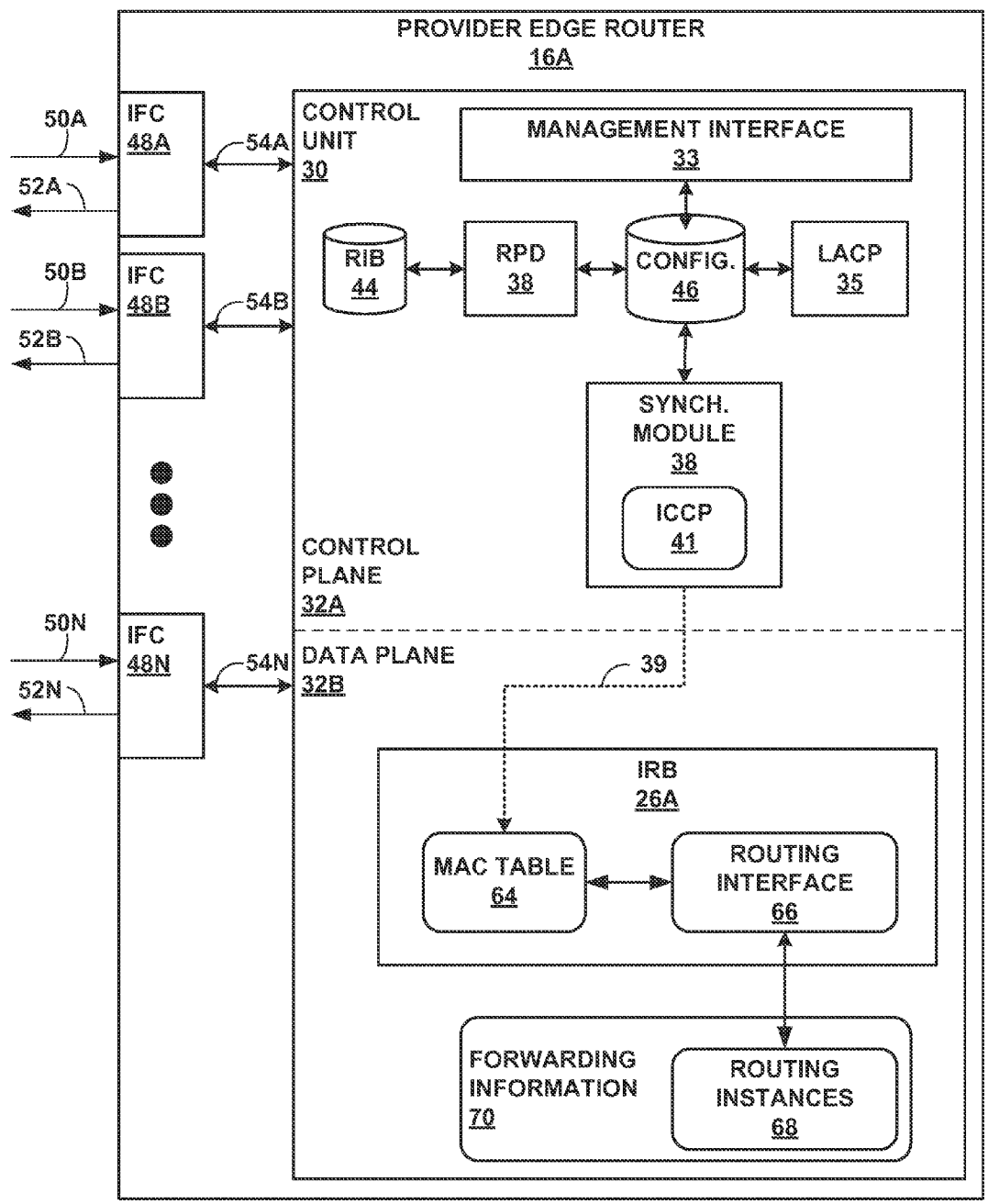
FIG. 3 is a block diagram illustrating, in further detail, an example of a provider edge router that synchronizes L2 addresses with another provider edge router to support an active-active multi-homed customer network in accordance with techniques described herein.

FIG. 3 is a block diagram illustrating an example of provider edge router 16A ("PE 16A") of FIGS. 1-2 in further detail. For purposes of illustration, PE 16A may be described below within the context of network system 2 of FIG. 1 and may represent any of PEs 16A, 16B. Moreover, while described with respect to a particular network device, e.g., a router, the techniques may be implemented by any network device that may operate as a service endpoint, such as an L3 switch, and should therefore not be limited to the example embodiments described in this disclosure.

Provider edge router 16A includes a control unit 30 and interface cards 48A-48N ("IFCs 48") coupled to control unit 30 via internal links 54A-54N. Control unit 30 may include one or more processors (not shown in FIG. 3) that execute software instructions, such as those used to define a software or computer program, stored to a computer-readable storage medium (again, not shown in FIG. 3), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 30 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 30 is divided into two logical or physical "planes" to include a first control or routing plane 32A ("control plane 32A") and a second data or forwarding plane 32B ("data plane 32B"). That is, control unit 30 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware and/or dynamically execute software or a computer program to implement the functionality.

Control plane 32A of control unit 30 executes the routing functionality of PE 16A. In this respect, routing protocol daemon (RPD) 38 executes routing protocols (not shown in FIG. 2) by which routing information stored in routing information base 44 ("RIB 44") may be determined. RIB 44 may include information defining a topology of a network, such as SP network 12 of FIG. 1. RPD 38 may resolve the topology defined by routing information in RIB 44 to select or determine one or more routes through the network. Control plane 32A may then update data plane 32B with these routes, where data plane 32B maintains these routes as forwarding information 70. RIB 44 may in some aspects include one or more routing instances implemented by PE 16A, with each instance including a separate routing table and other routing information. Control plane 32A in such aspects updates forwarding information 70 with forwarding information for each of routing instances 68. In this respect, routing instance 68 each include separate forwarding information for use by data plane 32B in forwarding traffic in accordance with the corresponding routing instance.

Control plane 32A further includes management interface 33 by which a network management system, or in some instances an administrator using a command line or graphical user interface, may modify configuration data 46 (illustrated as "config. 46") to configure interfaces for multi-chassis link aggregation groups such as multi-chassis LAG 24. For example, management interface 33 may receive and store configuration data to configuration data 46 that directs PE 16A to peer with another router (e.g., PE 16B) to offer active-active multi-homing by establishing a multi-chassis link aggregation group, e.g., multi-chassis LAG 24, that includes an attachment circuit also configured within configuration data 46. Link Aggregation Control Protocol (LACP) 35 exchanges aggregated interface information with other network devices to bundle logical interfaces associated with the attachment circuit and treat the bundle as a single logical interface in terms of L2 forwarding. LACP 35 may use ICCP 41 to communicate with the peer router to establish the multi-chassis LAG. Control unit 30 may generate forwarding information 70 to include forwarding information that specifies configured multi-chassis LAGs, including the respective logical interface with the attachment circuit, e.g., attachment circuit 23A, and any underlying physical interfaces for the attachment circuit. In some instances, LACP 35 is configured to detect the customer-facing multi-chassis LAG of the plurality of active multi-chassis LAG links 23A, 23B. Some instances of PE 16A may not execute LACP 35.

Data plane 32B represents hardware or a combination of hardware and software of control unit 30 that forwards network traffic in accordance with forwarding information 70. Data plane 32B may include one or more forwarding units, such as packet forwarding engines ("PFEs"), that provides high-speed forwarding of network traffic received by interface cards 48 via inbound links 50A-50N to outbound links 52A-52N. Integrated routing and bridging interface instance 26A ("IRB 26A") processes and forwards network traffic received on a service link associated with IRB 26A. An administrator configures IRB 26A via management interface 33 to a bridging instance and to map routing interface 66 of the IRB to one of routing instance 68 for PE 16A. Routing interface 66 may represent a next hop or other reference of a logical interface (IFL) of IRB 26A, for example. In some embodiments, IRB 26A may be may be distributed among forwarding units of data plane 32B to enable high-speed integrated routing and bridging within the data plane.

Data plane 32B may execute IRB 26A to operate as a virtual switch or virtual bridge to interconnect multiple customer networks. IRB 26A performs L2 learning, that is, IRB 26A "learns" customer device L2 addresses (hereinafter, "MAC addresses") from inbound service link, interchassis link, and multi-chassis LAG link interfaces and associates those customer MAC addresses with corresponding outbound service link, interchassis link, and multi-chassis LAG link interfaces. IRB 26A includes MAC table 64 that maps learned L2 addresses to outbound interfaces of IFCs 48. In addition, MAC table 64 stores IRB L2 addresses (hereinafter, IRB MAC addresses) for the bridging instance that map to routing interface 66, which maps to one of routing instances 68. In this respect, such IRB MAC addresses map to the routing instance. In some instances, IRB 26A may store IRB MAC addresses separately from MAC table 64. MAC table 64 is an associative data structure and may be stored in content-addressable memory (CAM), ternary CAM (TCAM), or another medium. In some instances, a flag set for MAC table entries having IRB MAC addresses for the bridging instance indicates the respective IRB MAC address is mapped to the routing instance.

IRB 26A represents components of data plane 32B to implement the functionality provided by the interface. That is, IRB 26A represents hardware or a combination of hardware and software integrated routing and bridging according to techniques of this disclosure.

Control plane 32A further includes synchronization module 38 (illustrated as "synch. module 38") that executes a communication protocol to exchange, in accordance with techniques described herein, IRB MAC addresses with another PE router (e.g., PE 16B of FIGS. 1-2) that cooperates with PE 16A to offer active-active multi-homing to a customer network. Synchronization module 38 identifies an IRB MAC address for IRB 26A, e.g., a MAC address for the one of inbound interfaces 50 that carries one of multi-chassis LAG links 23A, 23B. Synchronization module 38 then generates synchronization message 28A that includes the IRB MAC address and sends synchronization message to PE 16B configured to peer with PE 16A to offer redundant L2 connectivity to customer network 14A.

In the illustrated example, synchronization module 38 generates synchronization message 28A as an inter-chassis configuration protocol (ICCP) message that carries the IRB MAC address for IRB 26A. Synchronization module 38 may extend ICCP to include a proprietary message type for synchronization message 28A or, alternatively, may add a type-length-value (TLV) object to an existing ICCP message type that has a value field set to the IRB MAC address. Synchronization module 38, in this example, executes ICCP 41 to output synchronization message 28A to PE 16B. In various instances, synchronization module 38 may use any suitable protocol for exchanging IRB MAC addresses with PE routers that peer with PE 16A to offer L2 connectivity in an active-active multi-homing configuration according to techniques described in this disclosure.

Synchronization module 38 additionally receives an IRB MAC address for IRB 26B from PE 16B in synchronization message 28B. Upon receiving the IRB MAC address for IRB 26B, synchronization module 38 installs the IRB MAC address for IRB 26B to MAC table 64 using installation control message 39 sent to IRB 26A. IRB 26A maps the IRB MAC address for IRB 26B to routing interface 66. MAC table 64 further includes an IRB MAC address for IRB 26A also mapped to routing interface 66.

IRB 26A classifies L2 PDUs received on multi-chassis LAG link 23A and destined for any of the IRB MAC addresses of MAC table 64 as L3 packets for routing using the one of routing instances 68 mapped to routing interface 66. In other words, when PE 16A receives an L2 PDU on multi-chassis LAG link 23A, IRB 26A determines the destination MAC address of the L2 PDU. When the destination MAC address matches one of the IRB MAC addresses installed to MAC table 64 and mapped to routing interface 66, IRB 26A classifies the L2 PDU as an L3 packet and provides the L2 PDU to the mapped one of routing instances 68 for L3 forwarding by data plane 32B. IRB 26A may decapsulate the L2 PDU of the L2 header and footer. When a destination MAC address of an L2 PDU does not match one of the IRB MAC addresses of MAC table 64, IRB 26A switches the L2 PDU using standard switching techniques. In some instances, IRB 26A stores IRB MAC addresses separately from MAC table 64, performs a prior logical operation to classify L2 PDU as either routing traffic or bridging traffic, and then bridges the traffic or provides the traffic to a routing interface based on the result of classification.

By receiving and mapping IRB MAC addresses for multiple multi-homing PE routers for a bridging instance to one of routing instances 68 in this manner, PE 16A may eschew unnecessary L2 forwarding of L2 PDUs received on multi-chassis LAG link 23A over inter-chassis communication channel 25 to PE 16B. PE 16A may instead immediately forward, in accordance with one of routing instances 68, routable packets received in L2 PDUs addressed to the IRB MAC address of IRB 26B of PE 16B.

Figure 4:
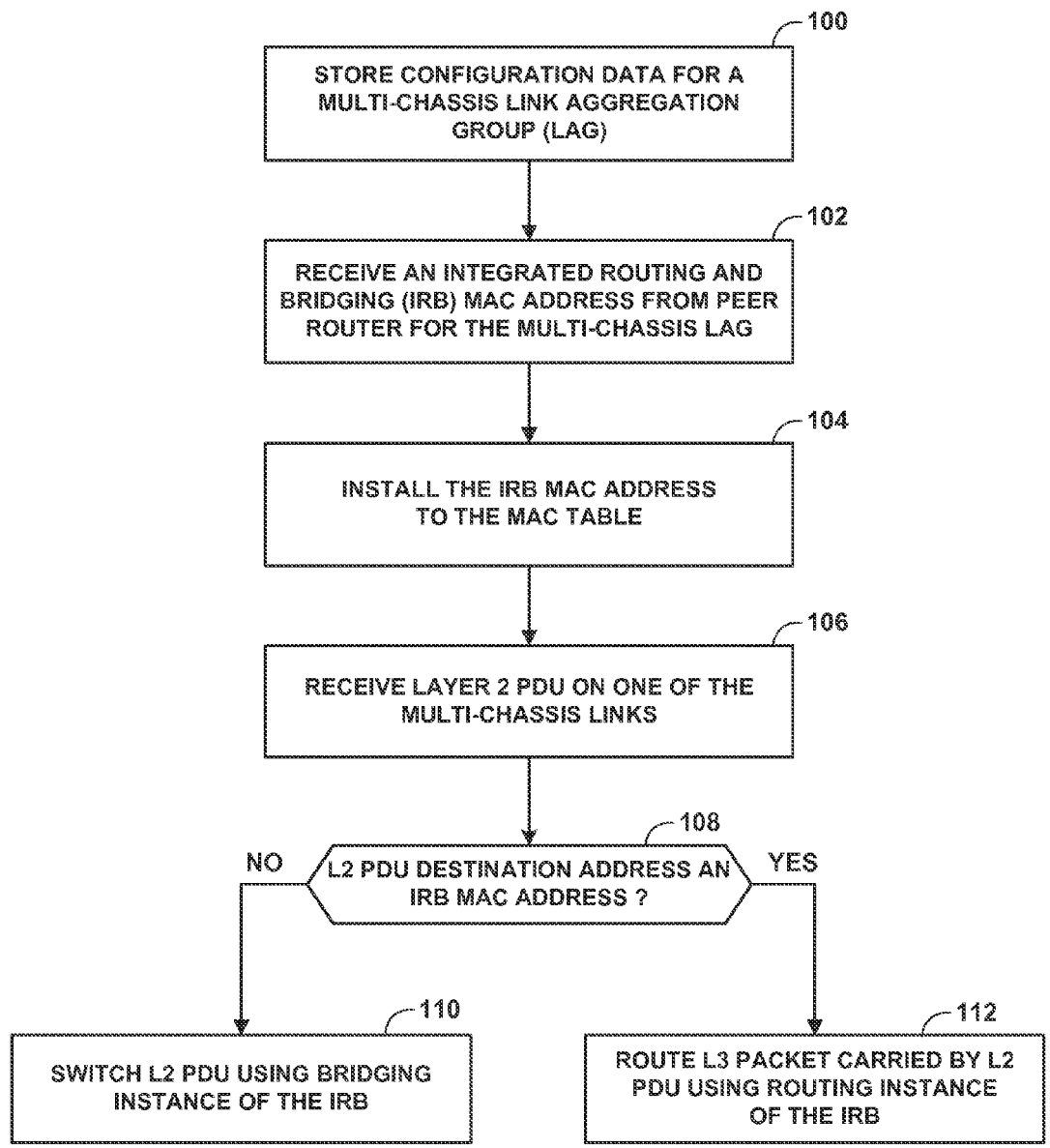
FIG. 4 is a flow chart illustrating an example mode of operation of a provider edge router to receive an L2 MAC address of an integrated routing and bridging instance and use the L2 MAC address to divert L2 Packet Data Units (PDUs) received on a multi-chassis link aggregation group link to a routing instance according to techniques described herein.

FIG. 4 is a flow chart illustrating an example mode of operation of provider edge router 16A of FIG. 3 to receive an L2 MAC address of an IRB and use the L2 MAC address to divert L2 PDUs received on a multi-chassis LAG link to a routing instance. Initially, management interface 33 receives and stores configuration data to configuration data 46 that establishes, in PE 16A, a multi-chassis LAG that includes a multi-chassis LAG link (100). Synchronization module 38 receives an IRB MAC address from another router (e.g., PE 16B of FIGS. 1-2) that is a peer router for PE 16A with respect to the multi-chassis LAG (102). Synchronization module 38 installs the IRB MAC address to IRB 26A by sending installation control message 39 to data plane 32B (104), which maps the IRB MAC address to routing interface 66 of IRB 26B, an interface to one of routing instances 68. The terms "map" or "mapping," as used herein, may refer to any operation that modifies one or more data structures to associate at least two objects (e.g., addresses, interfaces, etc.) such that, provided a first object, the data structure specifies the association from the first object to the second object.

One of interface cards 48 subsequently receives an L2 PDU on the multi-chassis LAG link that is run over one of inbound interfaces 50 (106). If the L2 PDU has a destination MAC address that matches the received IRB MAC address or the IRB MAC address for IRB 26A (YES branch of 108), then IRB 26A sends the L2 PDU to routing interface 66 for L3 routing by the mapped routing instance (112). Otherwise (NO branch of 108), data plane 32B switches the L2 PDU using IRB 26A (110). Data plane 32B may switch (e.g., flood) the L2 PDU to the peer router.

Figure 5:
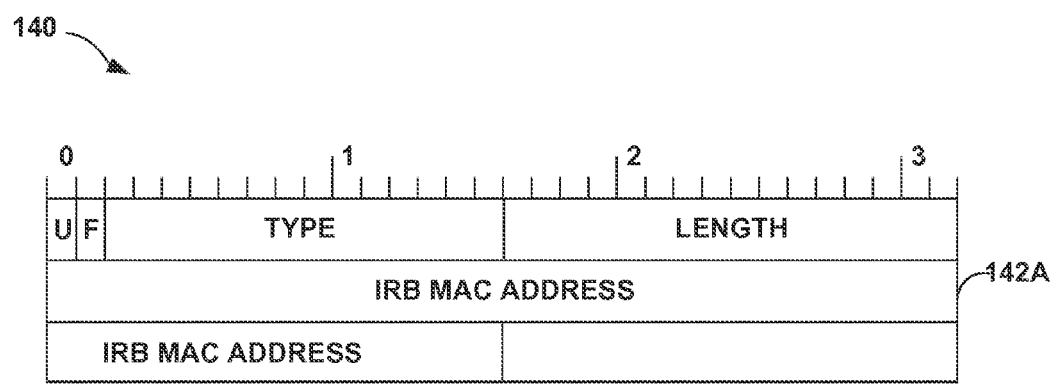
FIG. 5 is a block diagram illustrating an example synchronization message payload.

FIG. 5 is a block diagram illustrating synchronization message payload 140, an example instance of a payload of synchronization message 28A of FIG. 1. For ease of illustration, a corresponding message header is not shown in FIG. 5. Synchronization message 28A in this example instance may be an ICCP message that carries an IRB MAC address within a Type-Length-Value object represented by synchronization message payload 140, which may be only a subset of the ICCP message payload. In this example, synchronization message payload 140 represent an ICCP message optional parameter, which is described in Martini et al., incorporated above.

In this example, the synchronization message payload 140 is a triple <type, length, value> of variable length. The type is a 14-bit field that identifies one of the possible mandatory or optional parameter TLVs defined for ICCP message parameters. The synchronization message payload 140 type identifies synchronization message payload 140 as carrying an IRB MAC address for supporting active-active multi-homing. Length is a 2-octet field that indicates the TLV value field length. Value is of variable length and is encoded according to the TLV type. In this example, the TLV object contains a 48-bit IRB MAC address in IRB MAC address field 142A that should be installed to an IRB interface of the receiving router as an additional IRB MAC address. In one example, synchronization message payload 140 has a type value of 0x0011.

Figure 6:
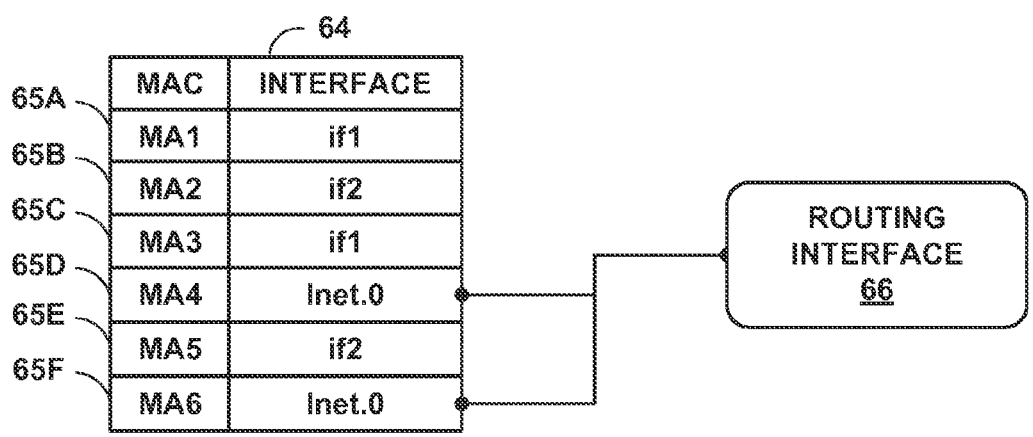
FIG. 6 is a block diagram illustrating an example instance of a MAC table that includes multiple integrated routing and bridging MAC addresses mapped to a routing interface of an integrated routing and bridging instance according to the techniques described herein.

FIG. 6 is a block diagram illustrating an example instance of MAC table 64 of FIG. 3 in detail. MAC table 64 includes MAC table entries 65A-65F ("MAC table entries 65") that each map an interface of PE 16A to a MAC address. For example, MAC table entry 65A maps the local interface if1 of PE 16A to MAC address MA1. Local interfaces may represent a hardware interface, such as one of inbound interfaces 50 of PE 16A, or a logical interface, such as an interface for multi-chassis LAG link 23A. Some of MAC table entries 65 may map to an inter-chassis communication channel interface. As PE 16A performs MAC learning, IRB 26A learns customer-facing and inter-chassis interfaces for additional MAC addresses in the network and adds additional MAC entries to MAC table 64 to store the association for more efficient switching.

Still further MAC table entries 65 include respective MAC addresses that map to routing interface 66. In the illustrated example, MAC table entries 65D and 65F map respective MAC address to the Inet.0 routing instance for PE 16A, where routing interface 66 is an interface, such as a next hop, reference, or pointer, to the Inet.0 routing instance. Routing interface 66 may represent a next hop of a logical interface of IRB 26A, for example. In general, a next hop is a data structure that directs the manner in which packet forwarding units, such as PFEs, process a PDU. In accordance with techniques of this disclosure, each of the MAC addresses for MAC table entries 65D and 65F is an IRB MAC address for a PE router that offers redundant L2/L3 connectivity in an active-active multi-homing configuration using a multi-chassis LAG PE 16A receives IRB MAC address (e.g., MA6) from a peer router for the multi-chassis LAG, maps routing interface 66 to the received IRB MAC address in a new MAC table entry (e.g., MAC table entry 65F), and installs the new MAC table entry to MAC table 64. Thereafter, PE 16A looks up received L2 PDU destination MAC addresses to identify a learned interface, if any, for the L2 PDU. Upon keying the L2 PDU destination MAC address to one of MAC table entries 65 that includes an IRB MAC address, e.g., MAC table entry 64F, PE 16A sends the L2 PDU to the routing instance identified by routing interface 66 and routes the L3 packet therein in accordance with the routing interface.

In some instances, IRB 26A of PE 16A stores and associates IRB MAC addresses for PE routers in a data structure separate from MAC table 64. Upon receiving an L2 PDU, PE 16A first keys the L2 PDU destination MAC address into the separate data structure to determine whether to send the L2 PDU to the routing instance identified by routing interface 66. If PE 16A does not find the L2 PDU destination MAC address in the separate data structure, PE 16A switches or broadcasts the L2 PDU based on whether the L2 PDU destination MAC address is present within MAC table 64.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   establishing, with a router, a multi-chassis link aggregation group (LAG) in an active-active multi-homing configuration with a peer router to provide a layer two (L2) network with redundant layer three (L3) connectivity to an L3 network;
   receiving, with the router, a synchronization message that specifies an L2 address of the peer router;
   associating the L2 address of the peer router with a routing instance of the router without using a virtual gateway L2 address shared by the router and the peer router;
   receiving, with the router, an L2 packet data unit (PDU) from the L2 network; and
   routing, with the routing instance of the router when the PDU has an L2 destination address that matches the L2 address of the peer router, an L3 packet encapsulated at least in part by the PDU to the L3 network without switching the PDU toward the peer router according to the L2 destination address of the PDU.

2. The method of claim 1, further comprising:
   switching the PDU toward the peer router when the PDU has an L2 destination address that does not match the L2 address of the peer router or an L2 address of the router.

3. The method of claim 1,
   wherein the synchronization message is a first synchronization message, the method further comprising:
   sending a second synchronization message that specifies the L2 address of the router from the router to the peer router.

4. The method of claim 1, wherein the router comprises a virtual router and the L2 address of the router is a virtual L2 address of the virtual router.

5. The method of claim 1, further comprising:
   detecting, by the router, failure of the peer router with respect to operation of the multi-chassis LAG;
   sending, by the router and in response to detecting the failure of the peer router, a gratuitous Address Resolution Protocol (ARP) message to the L2 network to prompt a host device of the L2 network to acquire a new L2 address for a default network gateway address of the host device.

6. The method of claim 5, further comprising:
   subsequent to sending the gratuitous ARP message, receiving an ARP request message with the router from the host device, wherein the ARP request message specifies a network address of the router; and
   sending an ARP reply message to the host device specifying the L2 address of the router.

7. The method of claim 1, wherein the routing instance is associated with an integrated routing and bridging interface instance.

8. The method of claim 2, wherein the L2 address of the router comprises an L2 address of an integrated routing and bridging interface instance associated with the routing instance.

9. The method of claim 1, further comprising:
   executing an Inter-chassis Configuration Protocol with the router to receive an Inter-chassis Configuration Protocol message comprising the synchronization message.

10. The method of claim 9, wherein the synchronization message comprises an inter-chassis configuration parameter that specifies the L2 address of the peer router.

11. A network device comprising:

a control unit comprising one or more processors;

an interface of the control unit configured to provide a multi-chassis link aggregation group (LAG) in an active-active multi-homing configuration with a peer network device of the network device to provide a layer two (L2) network with redundant layer three (L3) connectivity to an L3 network;

a synchronization module of the control unit configured to receive a synchronization message that specifies an L2 address of the peer network device, wherein the synchronization module is configured to associate the L2 address of the peer network device with a routing instance of the network device, wherein an L2 address of the network device is also associated with the routing instance of the network device, and wherein neither the L2 address of the peer network device nor the L2 address of the network device comprises a virtual gateway L2 address shared by the network device and the peer network device, wherein the interface is configured to receive an L2 packet data unit (PDU) from the L2 network; and a routing instance of the control unit configured to route, when the PDU has an L2 destination address that matches the L2 address of the peer router, a layer three (L3) packet encapsulated at least in part by the PDU to the L3 network without switching the PDU toward the peer router according to the L2 destination address of the PDU.

12. The network device of claim 11, further comprising:

a bridging instance of the control unit configured to switch the PDU toward the peer network device when the PDU has an L2 destination address that does not match the L2 address of the peer network device or an L2 address of the network device.

13. The network device of claim 11, wherein the synchronization message is a first synchronization message, and wherein the synchronization module is configured to send a second synchronization message that specifies the L2 address of the network device from the network device to the peer network device.

14. The network device of claim 11, wherein the network device comprises a virtual router and the L2 address of the network device comprises a virtual L2 address of the virtual router.

15. The network device of claim 11, further comprising:

a link aggregation control protocol module configured to detect a failure of the peer network device with respect to operation of the multi-chassis LAG, wherein the synchronization module is configured to send a gratuitous Address Resolution Protocol (ARP) message to the L2 network to prompt a host device of the L2 network to acquire a new L2 address for a default network gateway address of the host device.

16. The network device of claim 15, wherein, subsequent to sending the gratuitous ARP message, the synchronization module is configured to receive an ARP request message from the host device, wherein the ARP request message specifies a network address of the network device, wherein the synchronization module is configured to send an ARP reply message to the host device specifying the L2 address of the network device.

17. The network device of claim 11, further comprising:

an integrated routing and bridging interface instance associated with the routing instance.

18. The network device of claim 12, wherein the L2 address of the network device comprises an L2 address of an integrated routing and bridging interface instance associated with the routing instance.

19. The network device of claim 11, wherein the synchronization module executes an Inter-chassis Configuration Protocol to receive an Inter-chassis Configuration Protocol message comprising the synchronization message.

20. The network device of claim 19, wherein the synchronization message comprises an inter-chassis configuration parameter that specifies the L2 address of the peer network device.

21. A non-transitory computer-readable medium comprising instructions for causing one or more programmable processors to:

establish, with a router, a multi-chassis link aggregation group (LAG) in an active-active multi-homing configuration with a peer router to provide a layer two (L2) network with redundant layer three (L3) connectivity to an L3 network;

receive, with the router, a synchronization message that specifies an L2 address of the peer router;

associate the L2 address of the peer router with a routing instance of the router without using a virtual gateway L2 address shared by the router and the peer router;

receive, with the router, an L2 packet data unit (PDU) from the L2 network; and route, with the routing instance of the router when the PDU has an L2 destination address that matches the L2 address of the peer router, a layer three (L3) packet encapsulated at least in part by the PDU to an L3 network without switching the PDU toward the peer router according to the L2 destination address of the PDU.

\* \* \* \* \*